United States Patent [19]
LeRoy et al.

[11] Patent Number: 5,970,474
[45] Date of Patent: Oct. 19, 1999

[54] REGISTRY INFORMATION SYSTEM FOR SHOPPERS

[75] Inventors: Michael LeRoy, Algonquin; Paul Wasson, Lake In The Hills; James Brabson, Woodridge; Ron Trainer, Rolling Meadows, all of Ill.

[73] Assignee: Sears, Roebuck and Co., Hoffman Estates, Ill.

[21] Appl. No.: 08/842,334

[22] Filed: Apr. 24, 1997

[51] Int. Cl.⁶ ........................................... G06F 17/60

[52] U.S. Cl. .................... 705/27; 705/26; 364/479.01

[58] Field of Search .................. 705/27, 26; 364/479.05, 364/479.03, 479.01

[56] References Cited

U.S. PATENT DOCUMENTS

| | | | |
|---|---|---|---|
| Re. 33,054 | 9/1989 | Markham | 235/385 |
| 4,780,599 | 10/1988 | Baus | 235/383 |
| 4,929,819 | 5/1990 | Collins, Jr. | 235/383 |
| 4,973,952 | 11/1990 | Malec et al. | 340/825.35 |
| 5,047,614 | 9/1991 | Bianco | 235/385 |
| 5,243,174 | 9/1993 | Veeneman et al. | 235/381 |
| 5,361,871 | 11/1994 | Gupta et al. | 186/61 |
| 5,513,117 | 4/1996 | Small | 264/479.03 |
| 5,581,707 | 12/1996 | Kuecken | 395/200.13 |
| 5,625,562 | 4/1997 | Veeneman et al. | 364/479.05 |
| 5,652,421 | 7/1997 | Veeneman et al. | 364/479.01 |
| 5,754,981 | 5/1998 | Veeneman et al. | 705/26 |
| 5,774,874 | 6/1998 | Veeneman et al. | 705/27 |

OTHER PUBLICATIONS

Dorris Nixon, "75 Years of Bridal Business", [The Evolution of the Bridal Registry and the Future of the Wedding Gift Industry], Gifts & Decorative Accesories, vol. 93, No. 5, P32(3), May, 1992.

Author unknown, "Computer System can Enhance Bridal Business", Gifts & Decorative Accesories, vol. 90, No. 6, P42(1), Jun. 1989.

*Primary Examiner*—Zarni Maung
*Assistant Examiner*—Philip B. Tran
*Attorney, Agent, or Firm*—Rudnick & Wolfe

[57] ABSTRACT

A product information system for selecting, monitoring and purchasing of products in a retail establishment includes a product selection device, a data processor, a registry retrieval device, a point-of-sale data input device, and a host computer. The product selection device identifies desired items selected by a registrant and routes the desired items to a registry database on a host computer. The data processor is adapted to communicate with the product selection device to thereby collect the desired items selected by the registrant and route the desired items to the host computer. The registry retrieval device is configured to retrieve updated registry data from the host computer in response to a request from a purchasing customer. The retrieval device has an output unit for displaying an updated list of items in the registry database. The point-of-sale data input device identifies desired items which have been purchased by a customer for routing to the host computer. The host computer has a storage unit for maintaining the registry database and a data processor for processing selection and purchasing transactions. Thus, desired items consecutively selected by the registrant are added to the registry database to create a registry list, and desired items purchased by the customer are associated with the registry database to create an updated list reflecting the purchase of said desired items.

22 Claims, 6 Drawing Sheets

REGISTRY NUMBER PROMPT

REGISTRY QUERY NOT FOUND MESSAGE

REGISTRY QUERY UNAVAILABLE MESSAGE

FIG. 4

SCAN ITEM PROMPT

```
SCAN NEXT ITEM
OR CHANGE THE
    QUANTITY

ITEM:
QTY:
```

DIVISION/STOCK PROMPT

```
    ENTER THE
  DIVISION AND
  STOCK NUMBER

DIV:
STOCK:
QTY:
```

PRICE QUERY NOT FOUND MESSAGE

```
PRICE NOT FOUND
    FOR ITEM

PRESS CLEAR TO
    CONTINUE
```

CONFIRM CHECKIN MENU

```
    SAVE THE
    REGISTRY?

1 YES
2 NO

_ENTER SELECTION
```

REGISTRY INFORMATION SYSTEM FOR SHOPPERS

FIELD OF THE INVENTION

The present invention relates generally to a product information system for selecting, monitoring and purchasing of products in a retail establishment, and more particularly, to a system for registering gift requests in a national database which is updatable to reflect customer purchases so that other customers can search the database and retrieve a current list to avoid making duplicate purchases.

BACKGROUND OF THE INVENTION

A typical consumer purchases gifts for others in connection with a wide variety of events, such as weddings, baby showers, birthdays, or the like. In the case of a wedding, couples typically create a registry of desired gifts at one or more stores prior to their wedding in order to give purchasers an idea of what items would make good wedding presents. However, as the number of gift purchasers for a given occasion grows, the chances of duplicating gift purchases increases substantially because the registry may not reflect gifts already purchased by other customers. Moreover, a purchasing customer typically has to travel to that particular store to retrieve the registry and make the purchase, which can be inconvenient and is sometimes impractical, depending on where the customer lives.

In department stores, supermarkets, and other retail establishments, products for sale are typically labeled with a uniquely identifying bar code. These products can be scanned at a checkout station to initiate an automatic retrieval of price from an in-store processor and computer database. Typically, the only information provided to the customer is the price of the product at the checkout station. Some attempts have been made to provide the customer with a portable scanner which interacts with the customer to provide more information about the product while the customer is making purchasing decisions throughout the store rather than at the checkout station.

For example, some portable devices provide individual shoppers with microprocessor units that can scan the bar codes, display updated product prices and other information derived from the in-store database, and allow manipulation of information such as keeping a list of items purchased, the total cost, sales tax, etc. However, these types of units require that the product information be updated after the unit is returned to a staging area where the unit's power is recharged. Thus, there remains a lag time which can cause discrepancies between the product information in the portable unit and at a checkout station, even though both locations derive the information from the same in-store database. Therefore, it remains desirable to provide a product information system that provides "real-time" updated information from a host database. In addition, it is desirable to provide the customer with information reflecting input by third parties, such as the registrant or other customers, whether the information came from the same store or other stores.

Other attempts have been made to provide portable scanners containing a display device and a reading device for taking stock of the number and type of available goods for inventory purposes. Such systems have also been utilized with wireless communication systems between the reading device and the in-store data processing unit. For example, one such system incorporates a compact hand unit comprising a transmitter for wireless communication of the code detected to a receiver in an in-store data processing unit. Typically, transmission is effected by radio waves, especially in the VHF range.

Nevertheless, it remains desirable to provide a handheld wireless system in connection with a local area network adapted to interface with an in-store processor, a registry retrieval device configured to retrieve updated registry data from a host computer in response to a request from a purchasing customer, and a point of sale data input device for identifying desired items which have been purchased.

SUMMARY OF THE INVENTION

In view of the above, and in accordance with one aspect of the present invention, there is provided a product information system for selecting, monitoring and purchasing of products in a retail establishment. The system includes a product selection device, a data processor, a registry retrieval device, a point-of-sale data input device, and a host computer. The product selection device identifies desired items selected by a registrant, such as wedding or birthday gifts, and routes the desired items to a registry database on a host computer. The data processor is adapted to communicate with the product selection device to thereby collect the desired items selected by the registrant and route the desired items to the host computer. The registry retrieval device is configured to retrieve updated registry data from the host computer in response to a request from a purchasing customer. The retrieval device has an output unit for displaying an updated list of items in the registry database. Once a customer has chosen a desired item for the registrant (i.e. a registered gift), the customer typically goes to a checkout counter where the point-of-sale data input device identifies the desired item for routing to the host computer. The host computer has a storage unit for maintaining the registry database and a data processor for processing selection and purchasing transactions. Thus, desired items consecutively selected by the registrant are added to the registry database to create a registry list, and desired items purchased by the customer are associated with the registry database to create an updated list reflecting the purchase of said desired items. The registry database is thereby automatically updated so that one customer does not purchase items that have already been purchased by another customer.

In another aspect of the invention, an inter-site product information system is provided for use in a plurality of retail establishments. A product selection device and a data processor are located at a registry enrollment site for identifying desired items selected by a registrant and routing the desired items to the registry database on a host computer. A registry retrieval device, a point-of-sale data input device, and another data processor are located at a separate customer purchase site for allowing a customer to retrieve updated registry information. A host computer is also provided to maintain the registry database and process selection and purchasing transactions. Thus, desired items consecutively selected by the registrant at the registry enrollment site are added to the registry database to create a registry count, and desired items subsequently purchased by the customer at the customer purchase site are associated with the registry database to create an updated list reflecting the purchase of the desired items. Preferably, a registry retrieval device and a point-of-sale input device are also provided at the registry enrollment site to allow customers to purchase items at that site as well as the customer purchase site. Furthermore, a product selection device is preferably provided at the registry enrollment site to allow the registrants to update the registry database at that site if desired.

In a preferred embodiment of the invention, the registry input device and the registry retrieval device at each site share the same interface hardware for operation by both the registrant and the purchasing customer. The interfacing hardware includes an input unit which can be a keyboard or a video display with an active touch surface, and an output unit which can be either a video display or a printer. Thus, the registrant can enter general information about an event such as a wedding on the keyboard or touch-screen monitor, and then select the desired items with the product selection device to create or update the registry database. The purchasing customer can then search for an updated registry list by entering a search query on the keyboard or touchscreen monitor for the registrant, such as the registrant's name or the date of the event. The monitor or printer displays the results of the search query to provide a list of registrants. Upon selecting the desired registrant, the system provides an updated list of items selected by the registrant and reflecting items already purchased by other customers. If a hardcopy is printed, the customer can take the updated list throughout the store to assist in choosing an appropriate gift for the registrant.

The product selection device is preferably configured as a portable, handheld system to allow the registrant to move about the retail establishment to select the desired items. The handheld system includes an input device in the form of an optical scanner and an output device in the form of a radio-frequency tranceiver. The scanner is operable to detect bar codes on the desired items, and the tranceiver is capable of communicating bidirectionally with the data processor through a local area network. Thus, the registrant can scan the bar codes of desired items to automatically transmit the selection data to the data processor via radio-frequency communication. In addition, the handheld system includes a manual input device, such as a keypad, which allows the registrant to input verifying information and override operation of the optical scanner. A microcomputer is also provided to process and confirm the verifying information and the accuracy of the bar codes. In addition, an output device in the form of a liquid-crystal-display unit is configured to display the verifying information being keyed in by the registrant, as well as the confirmation of the verifying information, which indicates that the registrant is authorized to proceed with scanning desired items with the scanner.

The point-of-sale data input device is preferably configured as a checkout counter bar code scanner operable to detect identifying bar codes on desired items that the purchasing customer has chosen to purchase. The point-of-sale device is also configured to access the registry database and verify that purchased items are associated with the proper registrant. For example, if the output device is a printer, a printout of the updated registry list is initially provided to the customer with an identifying bar code associated with the registry database of a particular registrant. The checkout scanner is operable to detect the identifying bar code on the printout, and transmit the registry identification to the host computer to associate the purchased items with the registry database and automatically update the registry database. More specifically, the checkout scanner transmits the purchase identification to the in-store processor, which then routes the information to the host computer, wherein consecutively purchased items are added to an "items purchased" column to thereby automatically update the registry database.

Preferably, the interface between the product selection device, data processor, registry retrieval device, and point-of-sale data input device at each site is provided by a token ring local area network system and a radio frequency local area network. Also preferably, the interface between the data processor at each site and the host computer is a wide-area-network.

The present invention provides significant advantages over other product selection and inventory systems. The system allows registrants to register gift requests in a national database which is updatable to reflect customer purchases so that other customers can search the database from any location in the country and retrieve a current list to avoid making duplicate purchases. The system also provides "real-time" updated information from a host database, which is in communication with localized networks over a wide area network.

The present invention, together with further objects and advantages, will be best understood by reference to the following detailed description taken in conjunction with the accompanying drawings.

BRIEF DESCRIPTION OF THE DRAWINGS

FIGS. 3 and 4 illustrate an output unit of a handheld unit displaying sequential messages that prompt a registrant to input certain information;

DETAILED DESCRIPTION OF THE PREFERRED EMBODIMENT(S)

Figure 1:
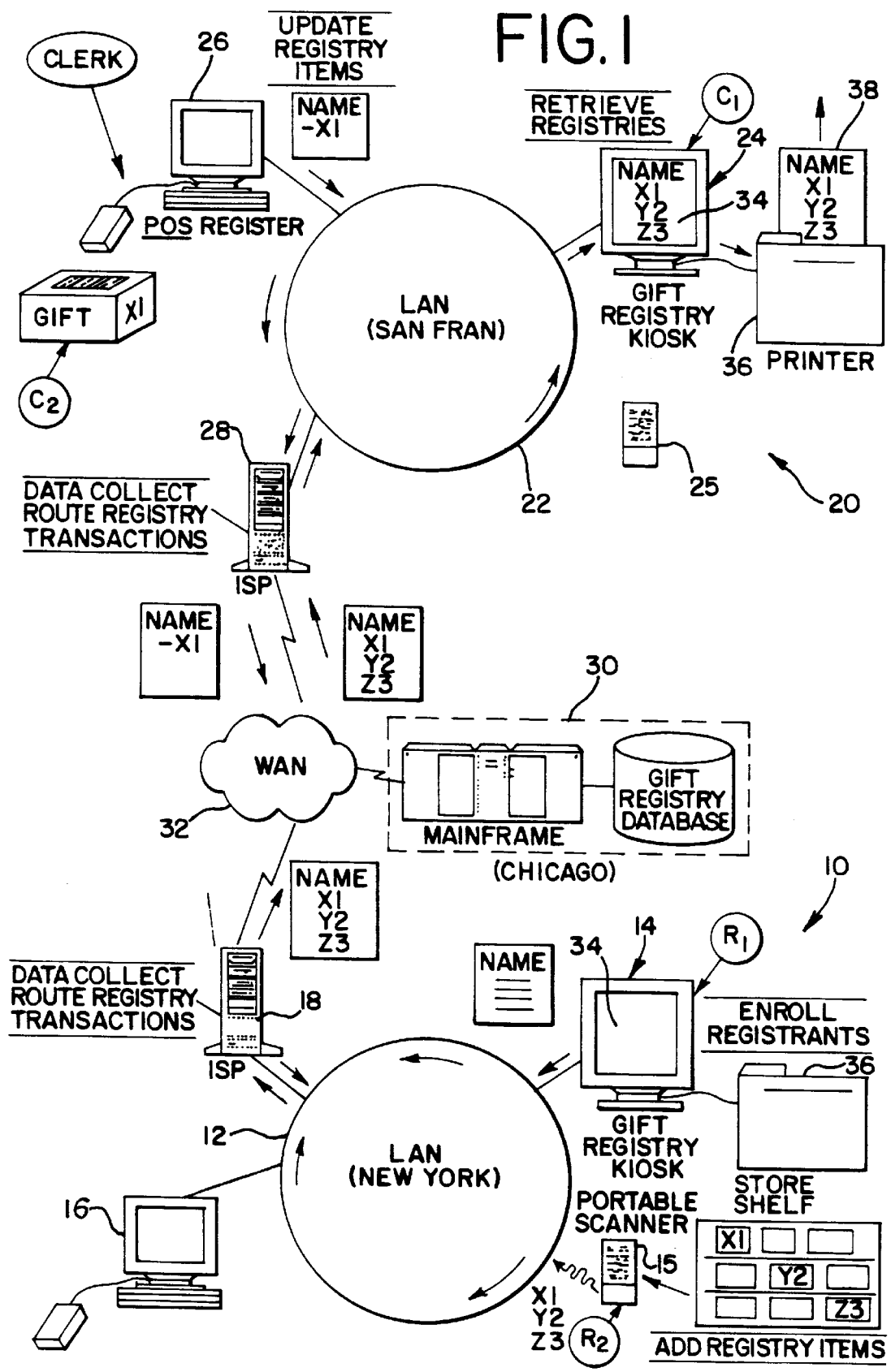
FIG. 1 is a schematic illustration of an inter-site product identification system according to a preferred embodiment of the present invention, showing a registrant entering registry data at one store location and a purchasing customer retrieving a registry and making a purchase at another store location.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring to the drawings, FIG. 1 illustrates an inter-site product information system for selecting, monitoring and purchasing of products in a plurality of retail establishments. As illustrated, a first store location 10 has a local area network 12 for interfacing with a gift registry kiosk 14, a product selection device 15, a point-of-sale data input device 16, and an in-store data processor 18. Similarly, a second store location 20 has a local area network 22 for interfacing with a gift registry kiosk 24, a product selection device 25, a point-of-sale data input device 26, and an in-store data processor 28. The two local area networks 12, 22 are in operable communication with a remote host computer 30 through a wide area network 32. Preferably, the local area networks 12 and 22 are token-ring type networks using existing store-level protocols and standards. Although only two store locations or retail sites 10 and 20 are shown, it will be appreciated that any number of sites can be incorporated in the network, and retail stores worldwide can be in operable communication in accordance with the present invention.

Preferably, the gift registry kiosks 14, 24 include interface hardware for operation by both a registrant and purchasing customers. The interfacing hardware includes an input unit which can be a keyboard or a video display with an active touch surface, and an output unit which can be either a video display 34 or a printer 36. Thus, the keyboard/touch-screen acts as both a registry input device for operation by the registrant, and a registry retrieval device for operation by the purchasing customers. To enroll, the registrant can enter general information about an event on the keyboard or touch-screen, such as the name and address of the registrant, the date of the event, the birthdate of the registrant, registrant comments, and delivery information. The registrant can then select the desired items throughout the store with the product selection device 15, 25 to create the registry database. After these steps have been completed, any purchasing customer can search for an updated registry list at either store by entering a search query on the keyboard/touchpad of the gift registry kiosks 14, 24. The query can search for a registered event or the name of the registrant to narrow the search to the registrant in question and thereby in order to obtain an updated list. The monitor 34 or printer 36 displays the results of the search query to provide an updated list of items selected by the registrant and not yet purchased by other customers. If a hard copy 38 of the list is printed, the customer can take the updated list throughout the store to assist in choosing an appropriate gift for the registrant. When the registrant or purchasing customers use the gift registry kiosks 14 or 24, the kiosks send and retrieve updated registry data to and from the host computer 30, over the LANs 12 and 22, and through the associated in-store processors 18, 28.

Various types of registry input devices and/or registry retrieval devices can be utilized to communicate with the in-store processors and host computer in accordance with the present invention. For example, separate computer stations can be provided for each device rather than combining the features in a single gift registry kiosk. In addition, a registrant may be able to enroll at home over a public access system such as the Internet, and purchasing customers can retrieve updated registry lists and make purchases with credit cards at home over such a public access system.

The product selection devices 15 and 25 identify desired items selected by a registrant, such as wedding or birthday gifts, and route the codes of the desired items to a registry database on the host computer 30. Preferably, the product selection devices 15 and 25 are the devices made by Telxon Corporation and sold as Model No. 960SL. These devices are configured as portable, handheld systems to allow the registrant to move about the retail establishments to select the desired items. The handheld systems include an input device in the form of an optical scanner and an output device in the form of a radio-frequency transmitter. The scanner is operable to detect bar codes on the desired items, and the transmitter is an RF communications card, preferably a token-ring card capable of communicating with the data processors 18, 28 through the local area networks 12 and 22. Thus, the registrant can scan the bar codes of desired items to automatically transmit the selection data to the data processor via radio-frequency communication.

In addition, the handheld systems include a manual input device, such as a 45-key alphanumeric keypad, which allows the registrant to input verifying information and override operation of the optical scanner. A microcomputer is also provided to process and confirm the verifying information and the accuracy of the bar codes. Preferably, the microcomputer includes at least an 8088 CPU, real-mode operation MS-DOS 5.0 operating system, 256K flash memory, 640K RAM, and is configured for NetBIOS support. In addition, an output device in the form of a liquid-crystal-display unit is configured to display the verifying information being keyed in by the registrant, as well as the confirmation of the verifying information, which indicates that the registrant is authorized to proceed with scanning desired items with the scanner. Preferably, the LCD unit is an 8 line×16 character display. Operation of the handheld system will be described in more detail below in connection with the overall system operation.

It will be appreciated that other product identification devices capable of transmitting data can be utilized in accordance with the present invention, such as manual input machines or computers. These machines can be at fixed locations such as checkout counters within the stores, and the information collected could be transmitted by various means, such as wire, ultra-sound or infrared or RF radiation. Moreover, other devices could be utilized so that a registrant can identify desired items for creating a registry. For example, a sponsoring store can post a Web page on the Internet listing many or all of the products offered within a nationwide chain of stores, and the registrant may be able to click on the desired items from a personal computer in the registrant's home.

The in-store data processors 18, 28 are adapted to communicate with the product selection devices 15 and 25 through the local area networks 12 and 22 to thereby collect the codes of desired items selected by the registrant. The processors then route the desired items to the host computer 30 to create a registry database. The data processors 18 and 28 are also operable to route data between the host computer 30, the gift registry kiosks 14, 24, and the point-of-sale data input devices 16, 26 to update and maintain the registry database.

Once a customer has chosen a desired item for the registrant (i.e. a registered gift), the customer typically goes to a checkout counter where the point-of-sale data input device 16 or 26 identifies the desired item for routing to the host computer 30. The point-of-sale data input devices 18, 28 are preferably configured as a checkout counter bar code scanner operable to detect identifying bar codes on desired items that the purchasing customer has chosen to purchase. In addition, the point-of-sale devices 16, 26 are configured to access the registry database and verify that purchased items are associated with the proper registrant. For example, if the output device is a printer, a printout of the updated registry list is initially provided to the customer with an identifying bar code associated with the registry database of a particular registrant. The checkout scanners 16, 26 are operable to detect the identifying bar code on the printout, and transmit the registry identification to the host computer to associate the purchased items with the registry database and automatically update the registry database. More specifically, the checkout scanner transmits the purchase identification to the in-store processor, which then routes the information to the host computer, wherein consecutively purchased items are added to an "items purchased" field to thereby automatically update the registry database.

The checkout scanner can be configured to automatically identify that a particular product is being purchased for a registrant, or an attendant can perform a manual operation to initiate a sequence indicating that the information is for a registry customer. Moreover, an attendant can manually flag an item as a gift item and key-in such items in a computer to update the registry database to reflect the number of items purchased for the registrant.

The host computer 30 has a storage unit for maintaining the registry database and a data processor for processing selection and purchasing transactions. Thus, desired items consecutively selected by the registrant are added to the registry database to create a registry list. Preferably, items subsequently purchased by customers are compiled to create a separate comparison list that is displayed on a printout adjacent to corresponding items on the registry list. This allows customers to view the printout to determine which items have already been purchased by other customers. Alternatively, a numeral can be placed next to purchased items on the registry list to indicate the number of items purchased by other customers. Furthermore, the host computer can be programmed so that items purchased by customers cause consecutive increments in a registry count, or consecutively purchased items can be subtracted from a running total of a registry count. Thus, the registry list can be automatically updated so that the printer only prints desired items which have not yet been purchased. It will be appreciated that it does not matter how the "items purchased" information is reflected on the updated registry list retrieved by customers. With regard to the incremental method of updating the database, items purchased by customers can be added to the registry count until a predetermined total is reached, or such items can be subtracted from the registry count until a zero value is achieved.

Figure 2:
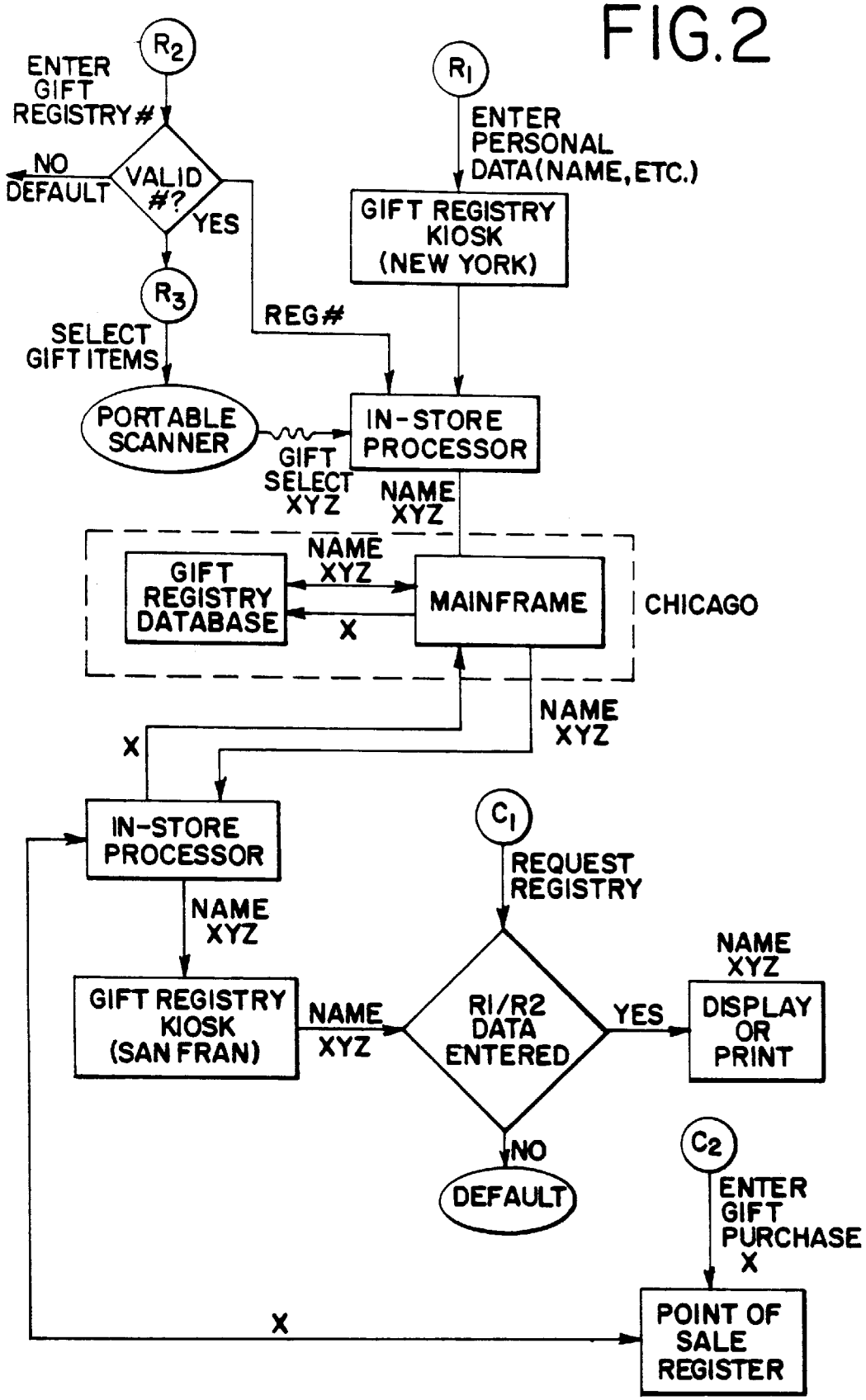
FIG. 2 is a schematic illustration, in block diagram form, of the inter-site product identification system shown in FIG. 1.
Figure 3:
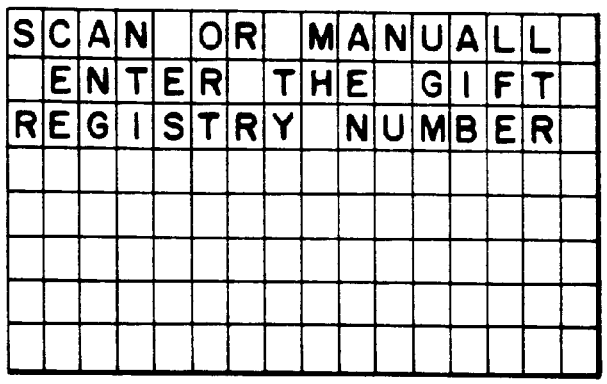
Figure 3:
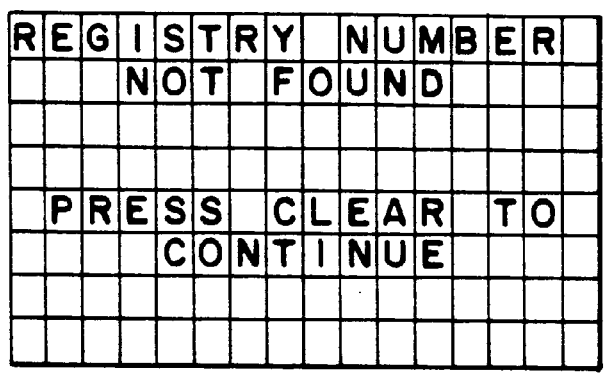
Figure 3:
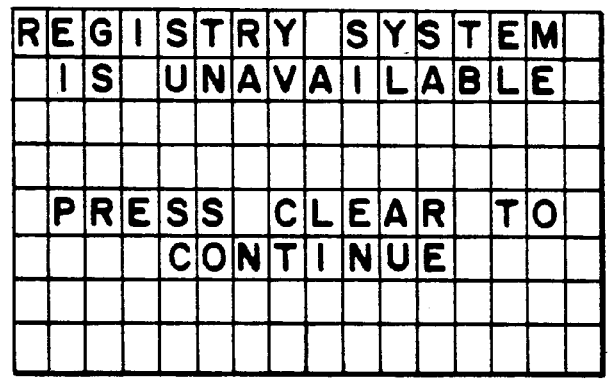

The operation of the inter-site product information system will now be described in connection with a wedding registry as illustrated in FIGS. 1–4. As shown in FIGS. 1 and 2, a registrant $R_1$ registers for a wedding using the gift registry kiosk 14 by entering his/her name and address, the spouse's name and address, the address where the couple will be after the wedding, the wedding date, gift delivery information, and general comments. This general information is collected by the input registry device and routed to the host computer 30 through the in-store processor 18. After the appropriate data is entered, the registry database is assigned a registry number, which is given to the registrant. The registrant then requests a hand-held product selection device 15 at $R_2$ from an assistant, and begins walking throughout the store to locate desirable gift items. In order to begin scanning desired items, the registrant $R_2$ must respond to a registry number prompt displayed on the LCD screen of the hand-held device 15 as shown in FIG. 3. Specifically, the registrant is prompted to scan or manually enter the gift registry number, or scans a registry number barcode from the print-out. The registrant then keys in the registry number on the keypad of the handheld device 15, which is then sent via RF transmission to the host computer 30 for verification. If the number is incorrect or there are other problems, the LCD display goes to a default mode and indicates that either the registry number was not found or the registry system is not available. If the registry number is confirmed, the registrant will be prompted to scan an item's bar code as shown in FIG. 4. At this time, a manual key may be pressed to permit manual entry of the item's division and stock number. When the manual key is pressed, the registrant is prompted to enter the item's division and stock number. The registrant can also press appropriate keys to send a query to the host computer for a price check or description of the desired item. The LCD display will then either display the desired information or indicate that such information could not be found.

The registrant proceeds throughout the store, scanning or manually inputting various desired items in desired quantities. This information is sent to the host computer 30 through the in-store processor 18 to create the registry database, which is stored in the host computer 30 where it can be retrieved from any store worldwide that is part of the network.

When a customer desires to purchase gifts for a registrant, the customer enters general information about the registrant at any gift registry kiosk. For example, if the registrant enrolled at a store in New York, a customer $C_1$ can go to the gift registry kiosk 24 at a store in San Francisco to obtain an updated registry list for the registrant. The customer may enter the registrant's name and state of residence, and all registrants with a matching name and home state will be displayed on the monitor 34. If the list is too long, the customer can enter other distinguishing information such as the spouse's name or the month of the wedding to narrow the list. After the customer finds the correct wedding registry, the updated list 38 can be printed on the printer 36.

Figure 5:
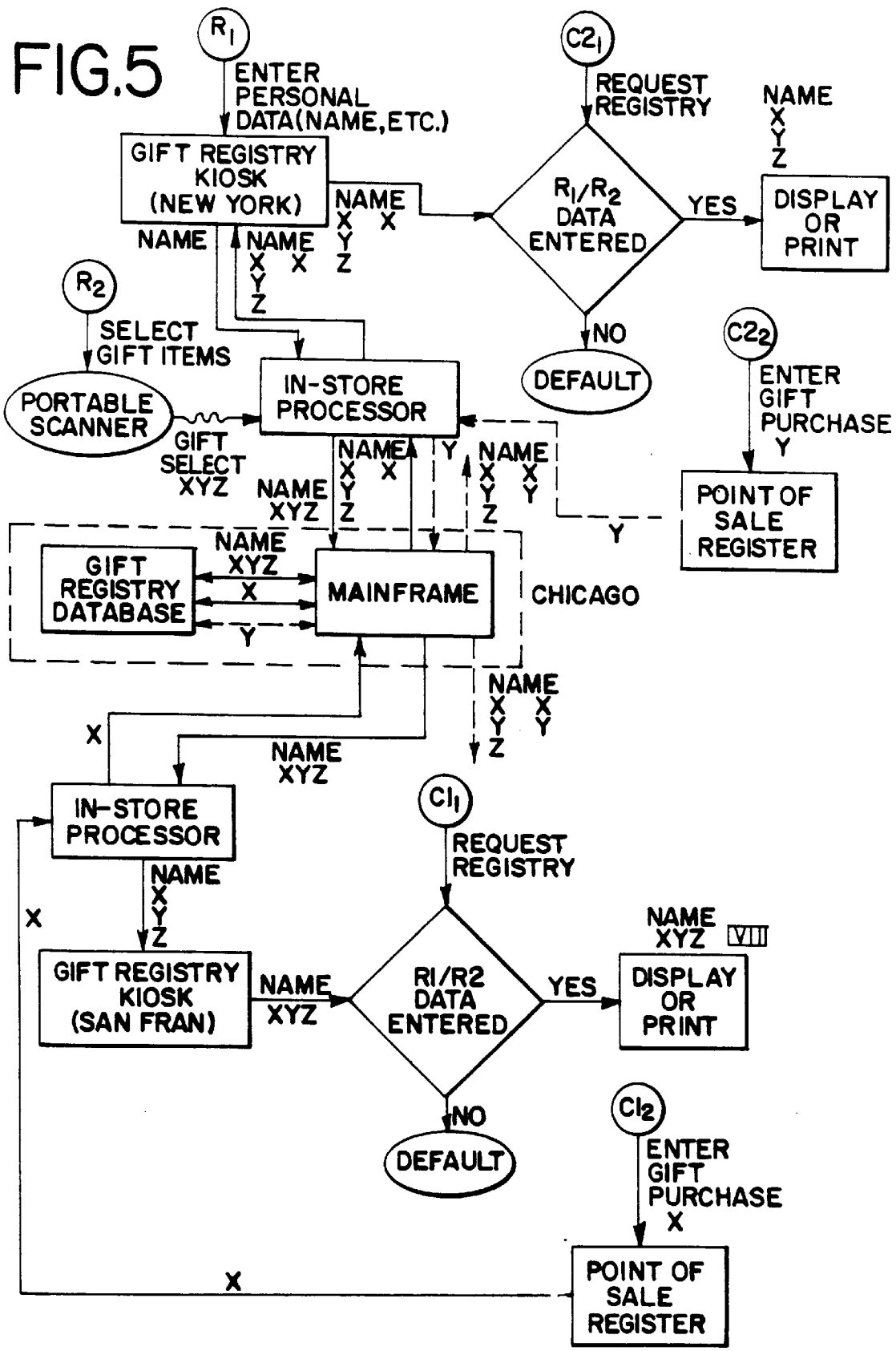
FIG. 5 is a schematic illustration, in block diagram form, of the inter-site product identification system illustrated in FIG. 1, showing a registrant entering registry data at one store location, a first purchasing customer retrieving a registry and making a purchase at that store location, and a second purchasing customer retrieving a registry and making a purchase at another store location.

The customer then proceeds throughout the store, with the list 38 in hand, and selects items to purchase on the list. The customer as at $C_2$ may then give the registry list to an assistant at the point-of-sale checkout station 12. The assistant will then scan the gift registry ID to be associated with the purchase and mark each gift item in the transaction at the point-of-sale register. The information from the transaction is used to create a list of "purchased items" that is preferably displayed next to corresponding items in the registry list. Thus, as shown in FIG. 5, a second customer $C2_1$ can search for an updated list on a kiosk at any store, retrieve a printout of an updated list that reflects the purchase previously made by the first customer C1, and purchase desired gifts on the list. The purchases made by $C2_2$ will also be sent to the host computer to update the registry database.

It will be appreciated that the registrant may choose to change registry information after they have registered. Any of the original information may be modified by the registrant, registered items may be deleted, or the requested/received quantities may be modified, by entering the registry ID and password at the gift registry kiosk. Moreover, additional items may be added by using the scanning process discussed above. Thus, one advantage of the present invention is that modifications to the gift registry database are made in "real time," thereby ensuring that the latest information is always provided to a purchasing customer desiring to purchase a gift for the registrant.

Figure 6:
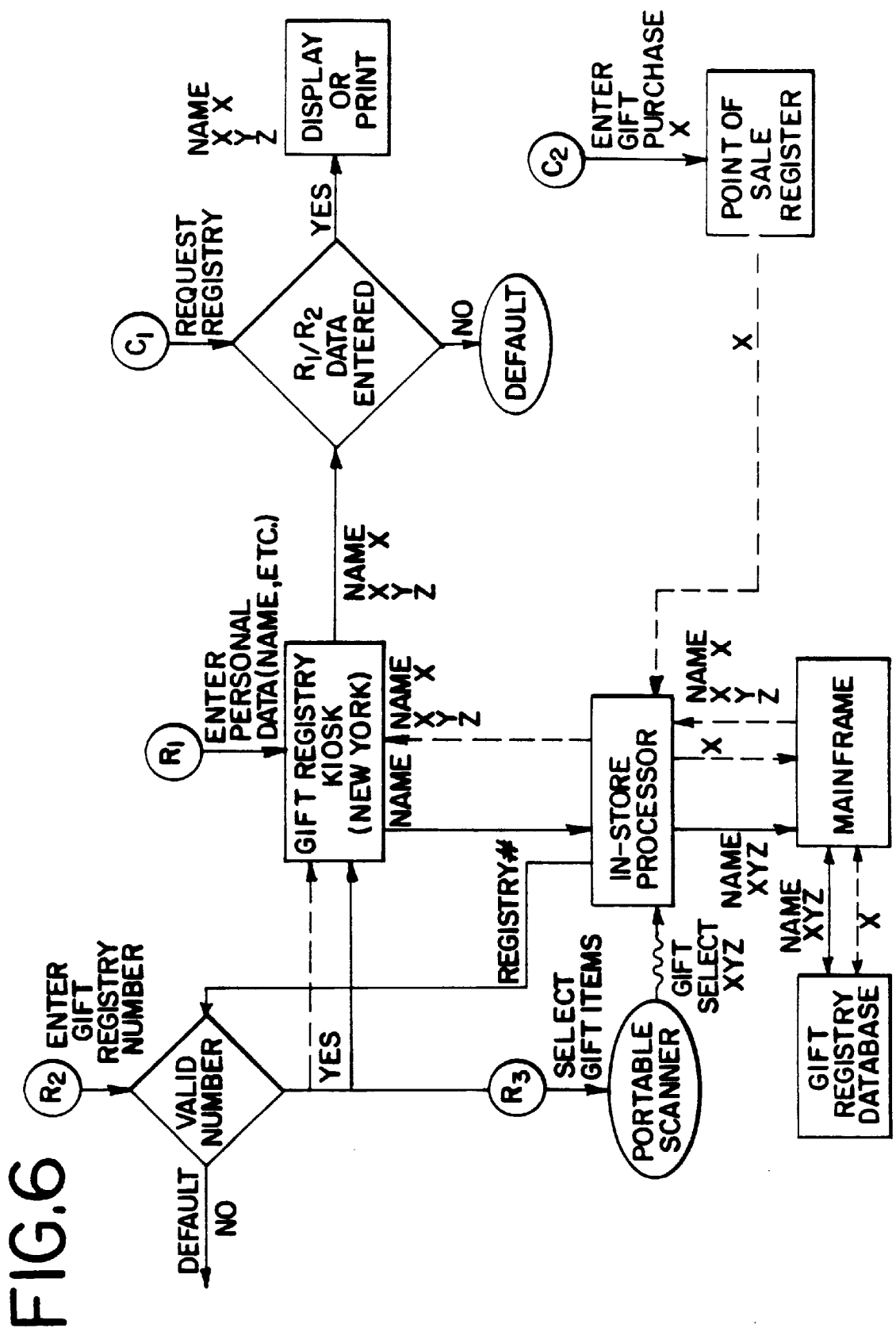
FIG. 6 is a schematic illustration, in block diagram form, of a single site product identification system, showing a registrant entering registry data and a purchasing customer retrieving a registry and making a purchase at that store location.

FIG. 6 illustrates the same system implemented at a single store rather than in an inter-site environment. The process described above is identical to the single store application, but the registrant and the customers use the same gift registry kiosk to enter and retrieve registry data. In addition, subsequent customers can use the same checkout station.

Thus, the present invention allows registrants to register gift requests in a national database which is updatable to reflect customer purchases so that other customers can search the database from any location in the country and retrieve a current list to avoid making duplicate purchases. The system also provides "real-time" updated information from a host database, which is in communication with localized networks over a wide area network.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A product information system for selecting, monitoring and purchasing of products in a retail establishment, comprising:
   a local area network;
   a handheld product selection device directly in communication with said local area network via wireless communication for identifying desired items selected by a registrant;
   a host computer providing a registry database in communication with said local area network;
   a data processor in communication with said local area network adapted to communicate with the product selection device via said local area network to thereby collect the desired items selected by the registrant and route said desired items to said registry database on said host computer;
   a registry retrieval device in communication with said local area network configured to retrieve updated registry data from the host computer in response to a request from a purchasing customer, said retrieval device having an output unit for displaying an updated list of items in the registry database;
   a point-of-sale data input device in communication with said local area network for identifying desired items which have been purchased by a customer for routing to said host computer;
   a registry input device in communication with said local area network for collecting general information from a registrant desiring to create said registry database; and
   said host computer having a storage unit for maintaining the registry database and a data processor for processing selection and purchasing transactions, wherein desired items consecutively selected by the registrant are added to the registry database to create a registry list, and desired items purchased by the customer are associated with the registry database to create an updated list reflecting the purchase of said desired items.

2. The system of claim 1 wherein the data processor is adapted to communicate with the registry input device and route the general information to the host computer, said host computer adapted to associate the general information with the updated list of items desired by the registrant, whereby a search request entered on the registry retrieval device by a purchasing customer can retrieve said general information and associated updated registry list.

3. The system of claim 2 wherein the registry input device and the registry retrieval device share the same interface hardware for operation by the registrant and the purchasing customer, respectively, said interfacing hardware comprising an input unit and an output unit.

4. The system of claim 3 wherein the input unit comprises one of a keyboard and a video display with an active touch surface, and the output unit comprises one of a video display and a printer, whereby the registrant enters general information regarding the registry database on the input unit and selects said desired items with the product selection device, the purchasing customer searches for an updated registry list results of said search query to provide an updated list of items selected by the registrant.

5. The system of claim 1 wherein the handheld system further comprises an input device operable for collecting data capable of identifying desired items selected by the registrant.

6. The system of claim 5 wherein the input device comprises an optical scanner operable to detect bar codes on said desired items, whereby the registrant scans the bar code of desired items to automatically transmit the selection data to the data processor via radio-frequency communication.

7. The system of claim 6 wherein the handheld system further comprises a second input device for receiving verifying information from the registrant, a microcomputer configured to process and confirm said verifying information, and a second output device for interaction with the registrant and displaying the input of said verifying information and the confirmation of said verifying information.

8. The system of claim 7 wherein the second input device comprises a keypad and the second output device comprises a liquid-crystal-display unit.

9. The system of claim 8 wherein the microprocessor is adapted to recognize manual input from the registrant on the keypad to thereby override the scanner and identify desired items.

10. The system of claim 1 wherein the interface between the data processor and the host computer comprises a wide-area-network.

11. The system of claim 1 wherein the output device comprises a printer configured to provide a printout of the updated registry list, said printout including an identifying bar code associated with the registry database, and wherein the point-of-sale data input device comprises a checkout counter bar code scanner operable to detect said identifying bar code on the printout, and transmit the registry identification to the host computer to associate said purchased items with the registry database and automatically update said registry database.

12. The system of claim 1 wherein said output unit is adapted to display indicia adjacent the registry list indicating the desired items purchased by a customer.

13. The system of claim 12 wherein said indicia comprises a numeral indicating the number of items purchased by customers.

14. The system of claim 12 wherein said indicia comprises a separate list of items purchased by a customer, said list being adjacent the registry list so that items purchased correspond with desired items on the list.

15. The system of claim 1 wherein desired items consecutively selected by the registrant are added to the registry database to create a registry count, whereby desired items purchased by the customer cause consecutive increments in the registry count.

16. The system of claim 15 wherein consecutively purchased items are subtracted from a running total of the registry count to thereby automatically update the registry database.

17. An inter-site product information system for selecting, monitoring and purchasing of products in a plurality of retail sites, comprising:
   a host computer providing a registry database;
   each of said sites comprising:
      a local area network in communication with said host computer;
      a handheld product selection device directly in communication with said local area network via wireless communication for identifying desired items selected by a registrant;

a product selection device data processor in communication with said local area network adapted to communicate with the product selection device via said local area network to thereby collect the desired items selected by the registrant and route said desired items to said registry database on said host computer;

a registry retrieval device in communication with said local area network configured to retrieve updated registry data from the host computer in response to a request from a purchasing customer, said retrieval device having an output unit for displaying an updated list of items in the registry database;

a point-of-sale data input device in communication with said local area network for identifying desired items which have been purchased by a customer for routing to said host computer;

a point-of-sale data processor adapted to communicate with the point-of-sale input device to thereby collect the desired items selected by the purchasing customer and route said desired items to the host computer; and said host computer having a storage unit for maintaining the registry database and a data processor for processing selection and purchasing transactions, wherein desired items consecutively selected by the registrant at the registry enrollment site are added to the registry database to create a registry list, and desired items purchased by the customer at the customer purchase site are associated with the registry database to create an updated list reflecting the purchase of said desired items.

18. The system of claim 17 wherein the host computer is located remotely from the local area networks, and the interface between the host computer and the local area networks comprises a wide-area-network system.

19. The system of claim 17 wherein each site further comprises a registry input device for collecting general information from a registrant desiring to create said registry database, wherein the data processor at the registry enrollment site is adapted to communicate with the registry input device and route the general information to the host computer, said host computer adapted to associate the general information with the updated list of items desired by the registrant, whereby a search request entered on a registry retrieval device by a purchasing customer can retrieve said general information and associated updated registry list.

20. The system of claim 17 wherein the handheld system further comprises an input device operable for collecting data capable of identifying desired items selected by the registrant, and an output device adapted to convey the collected data to the product selection device data processor.

21. The system of claim 20 wherein the input device comprises an optical scanner operable to detect bar codes on said desired items, and the output device comprises a radio-frequency transmitter capable of communicating with the product selection device, data processor, whereby the registrant scans the bar codes of desired items to collect the selection data and ultimately transmit said selection data to the product selection device data processor via radio-frequency communication.

22. The system of claim 17 wherein the output device comprises a printer configured to provide a printout of the updated registry list, said printout including an identifying bar code associated with the registry database, and wherein the point-of-sale data input device comprises a checkout counter bar code scanner operable to detect said identifying bar code on the printout, and transmit the registry identification to the host computer to associate said purchased items with the registry database and automatically update said registry database.

* * * * *